US012614842B2

(12) United States Patent
Seo et al.

(10) Patent No.: US 12,614,842 B2
(45) Date of Patent: Apr. 28, 2026

(54) RADAR ANTENNA

(71) Applicant: AMOSENSE CO., LTD., Cheonan-si (KR)

(72) Inventors: Yunsik Seo, Cheonan-si (KR); Hongdae Jung, Cheonan-si (KR); Jiwoong Jeong, Cheonan-si (KR); Seho Lee, Cheonan-si (KR); Hyungil Baek, Cheonan-si (KR); Hyunjoo Park, Cheonan-si (KR); Hanju Do, Cheonan-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 135 days.

(21) Appl. No.: 18/287,853

(22) PCT Filed: Apr. 19, 2022

(86) PCT No.: PCT/KR2022/005576
§ 371 (c)(1),
(2) Date: Oct. 20, 2023

(87) PCT Pub. No.: WO2022/225292
PCT Pub. Date: Oct. 27, 2022

(65) Prior Publication Data
US 2024/0364003 A1 Oct. 31, 2024

(30) Foreign Application Priority Data
Apr. 22, 2021 (KR) ......................... 10-2021-0052416

(51) Int. Cl.
*H01Q 1/52* (2006.01)
*G01S 7/02* (2006.01)
(52) U.S. Cl.
CPC ............. *H01Q 1/521* (2013.01); *G01S 7/027* (2021.05)

(58) Field of Classification Search
CPC ........ H01Q 1/521; H01Q 1/523; H01Q 1/525; H01Q 1/3233; H01Q 13/10; H01Q 1/526
See application file for complete search history.

(56) References Cited

U.S. PATENT DOCUMENTS

2013/0033404 A1 2/2013 Abe
2018/0254563 A1 9/2018 Sonozaki et al.
(Continued)

FOREIGN PATENT DOCUMENTS

JP 2000-341030 A 12/2000
JP 2003332834 A * 11/2003
(Continued)

OTHER PUBLICATIONS

Liao Yong, Meng Fanbao, Xu Gang, et al. Analysis of wide-angle scanning of HPM waveguide slot array antenna[J]. High Power Laser and Particle Beams, 2018, 30: 033002. doi: 10.11884/ HPLPB201830.170364 (Year: 2018).*
(Continued)

*Primary Examiner* — Dieu Hien T Duong
(74) *Attorney, Agent, or Firm* — Maschoff Brennan

(57) ABSTRACT

The present invention suggests a radar antenna in which a rounded edge surface is formed in a receiving hole formed by an antenna body and a shielding frame. The suggested radar antenna comprises: an antenna body having a plurality of first slots formed on a first surface thereof; and a shielding frame through which reception holes for receiving the plurality of first slots are formed, the reception holes being arranged on the first surface of the antenna body to receive the plurality of first slots, wherein a corner at which the inner wall surface of the shielding frame is connected to the first surface of the antenna body is formed to have a round structure.

4 Claims, 8 Drawing Sheets

(56)                    References Cited

U.S. PATENT DOCUMENTS

| | | |
|---|---|---|
| 2019/0305421 A1 | 10/2019 | Eom |
| 2020/0212594 A1 | 7/2020 | Kirino et al. |
| 2022/0231423 A1 | 7/2022 | Park et al. |

FOREIGN PATENT DOCUMENTS

| | | |
|---|---|---|
| JP | 2013-032979 A | 2/2013 |
| JP | 2017-060087 A | 3/2017 |
| JP | 2020-108147 A | 7/2020 |
| KR | 1020150059392 A | 6/2015 |
| KR | 10-2020-0137166 A | 12/2020 |

OTHER PUBLICATIONS

EP European Extended Search Report dated Sep. 3, 2024 in application 22791992.5.
KR Office Action dated Jul. 29, 2023 as received in Application No. 10-2021-0052416.

\* cited by examiner

[FIG. 1]
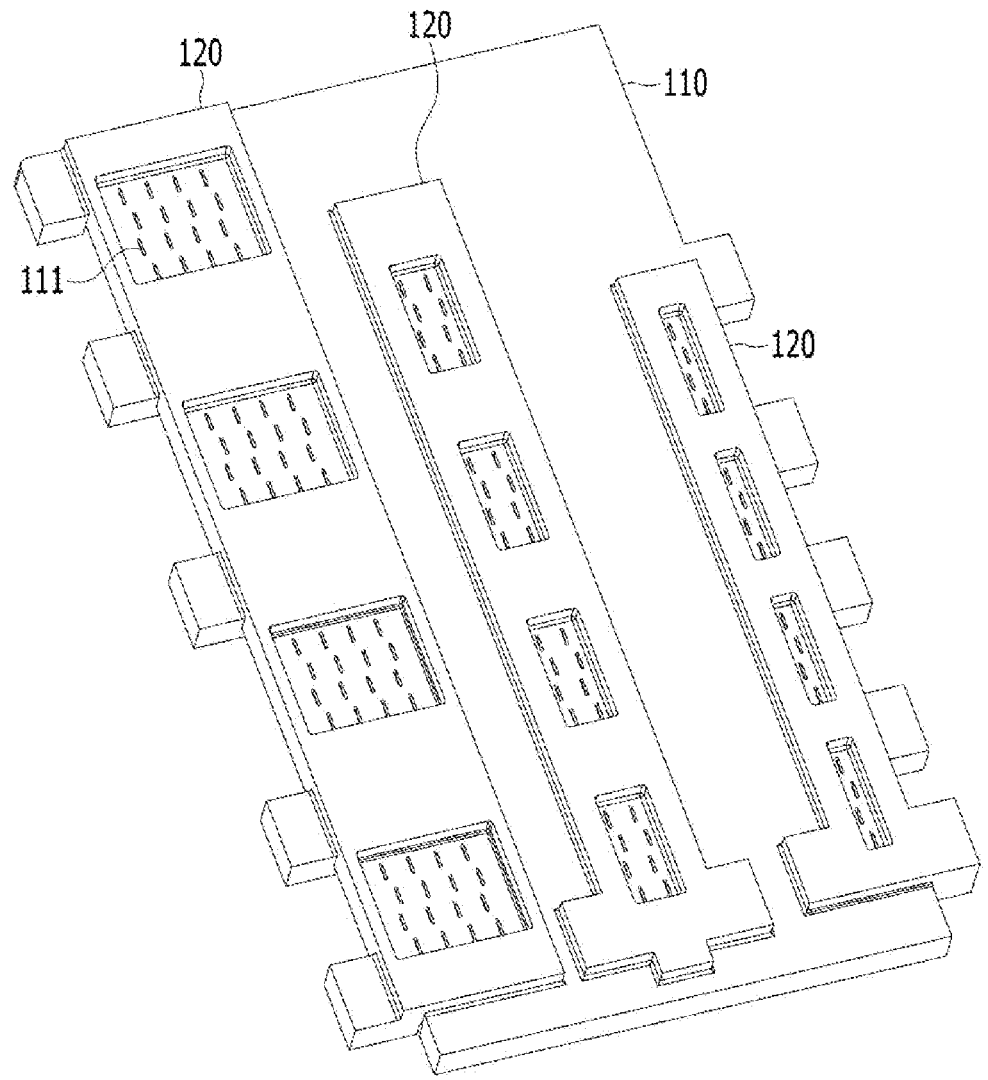

[FIG. 2]
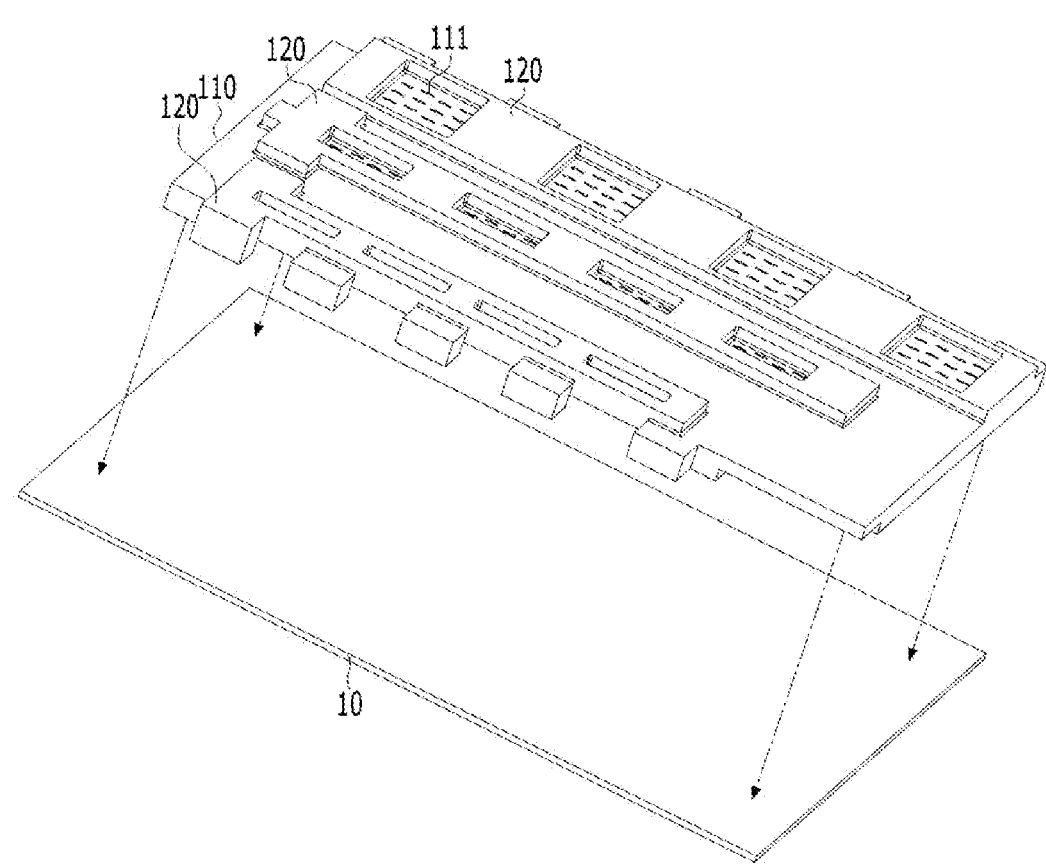

[FIG. 3]
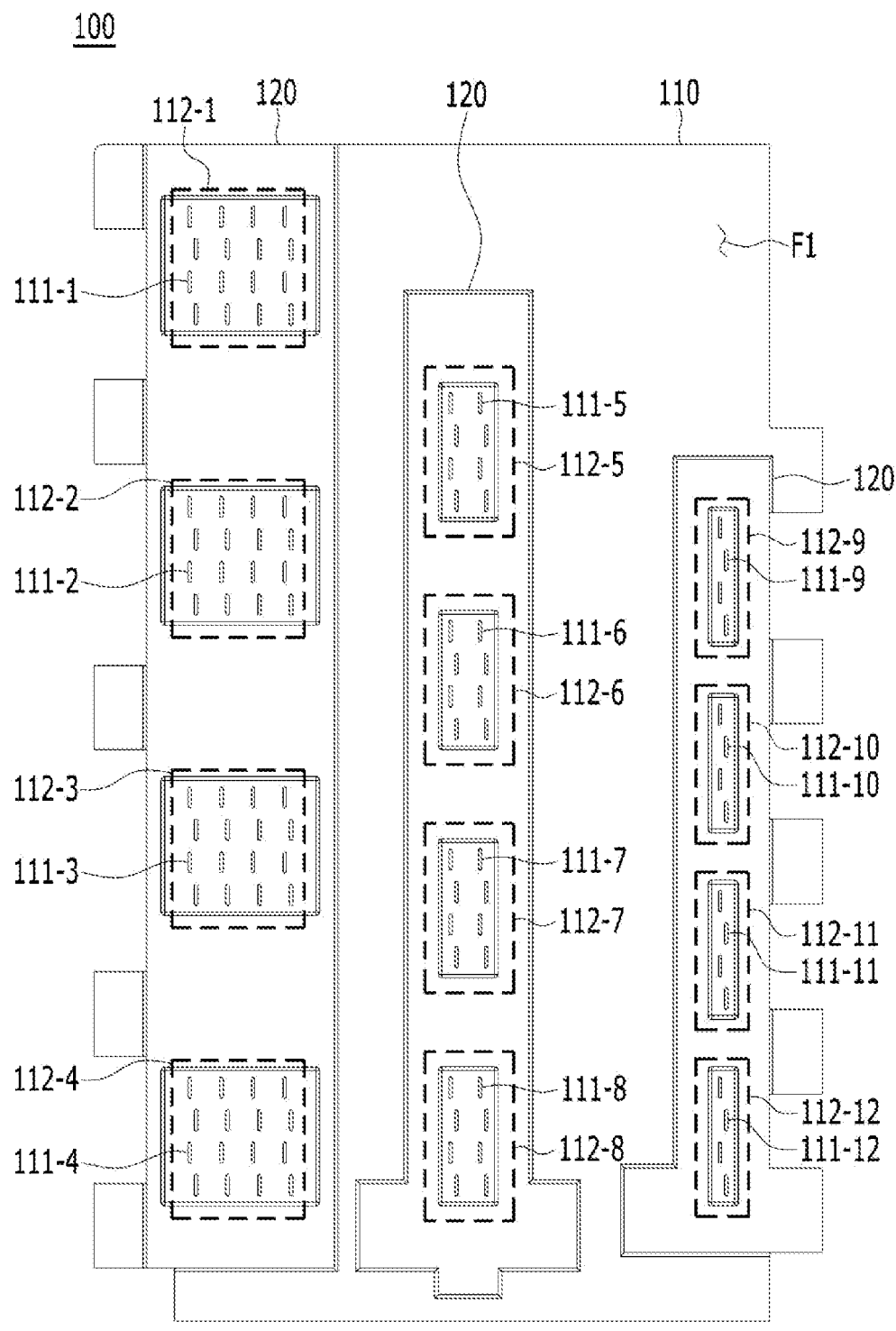

[FIG. 4]
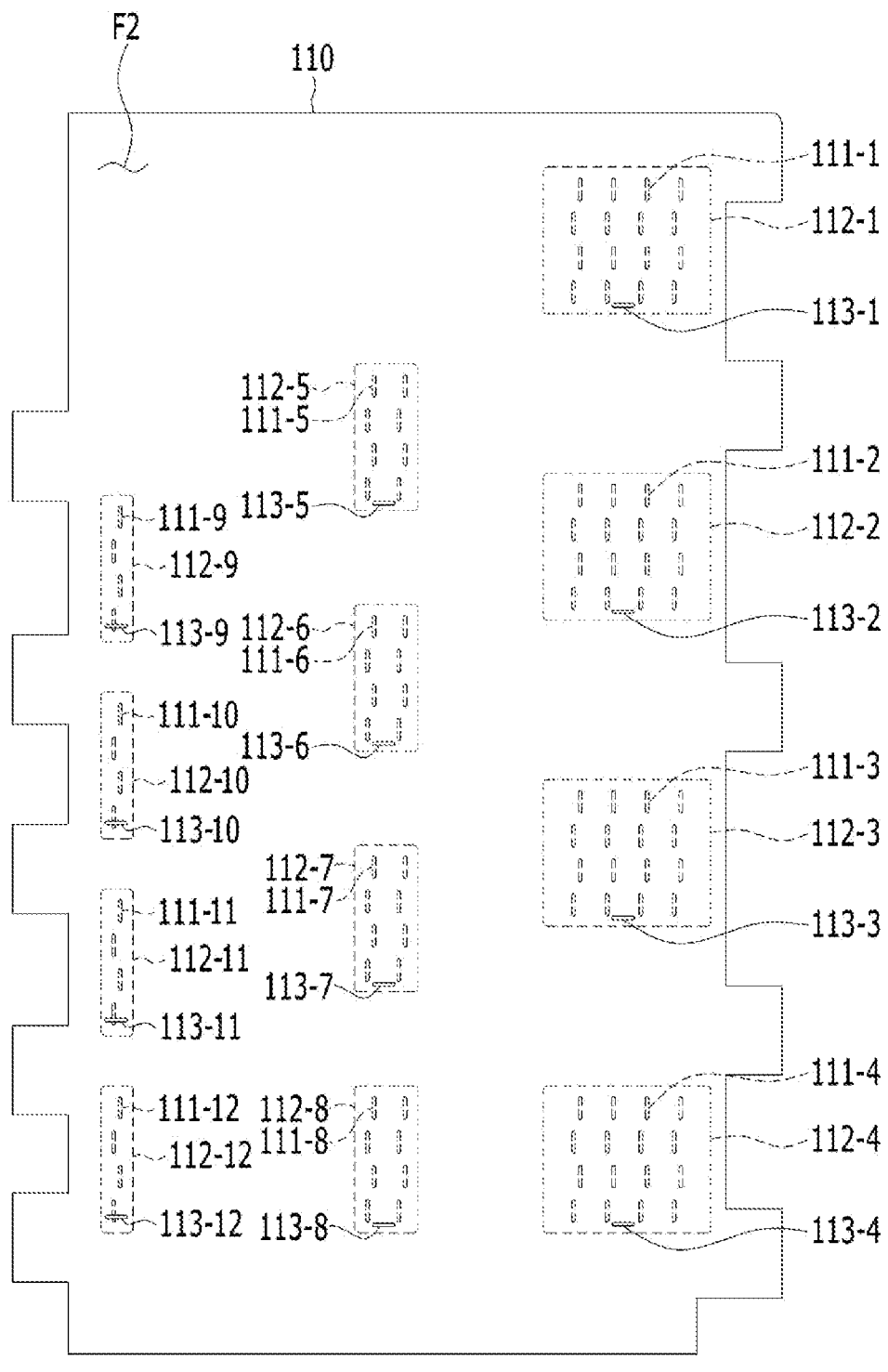

[FIG. 5]
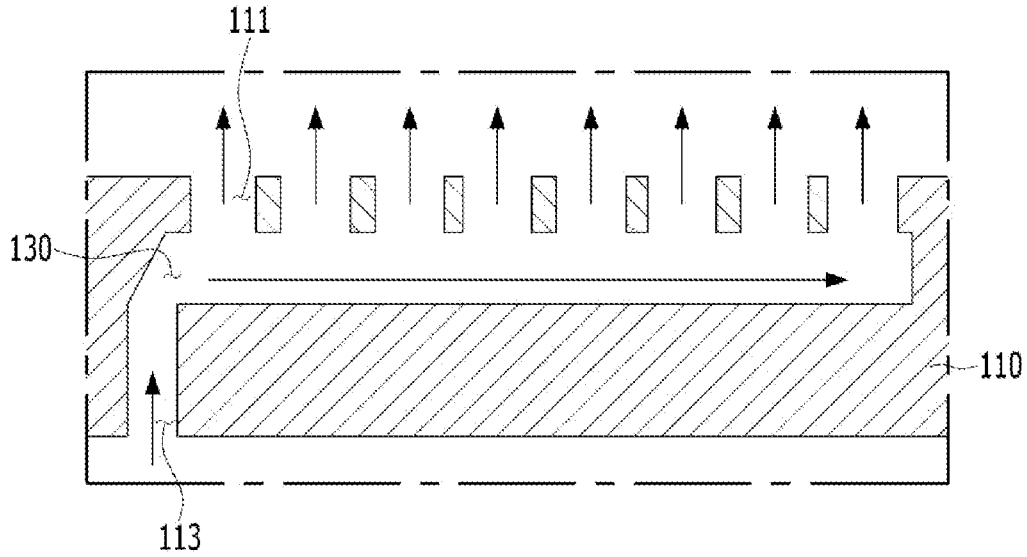
[FIG. 6]
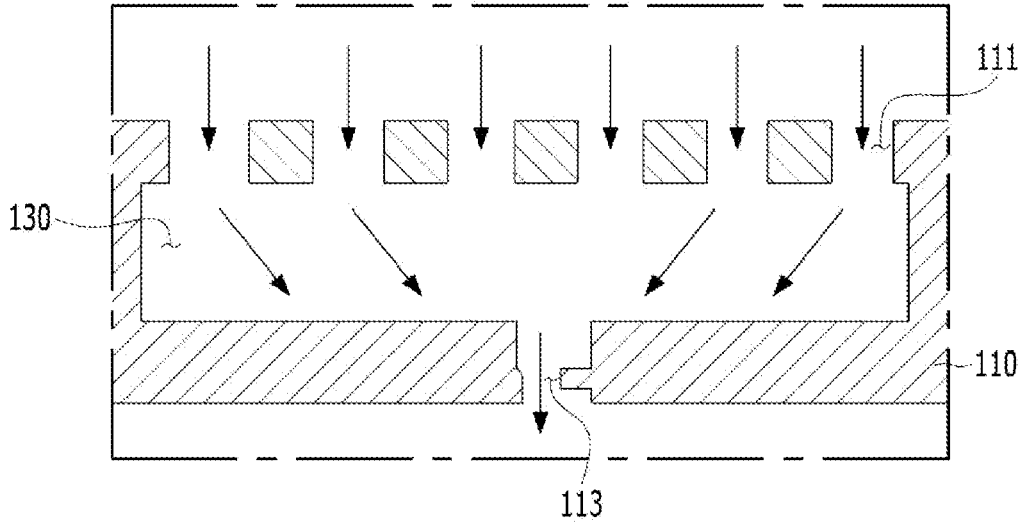

[FIG. 7]
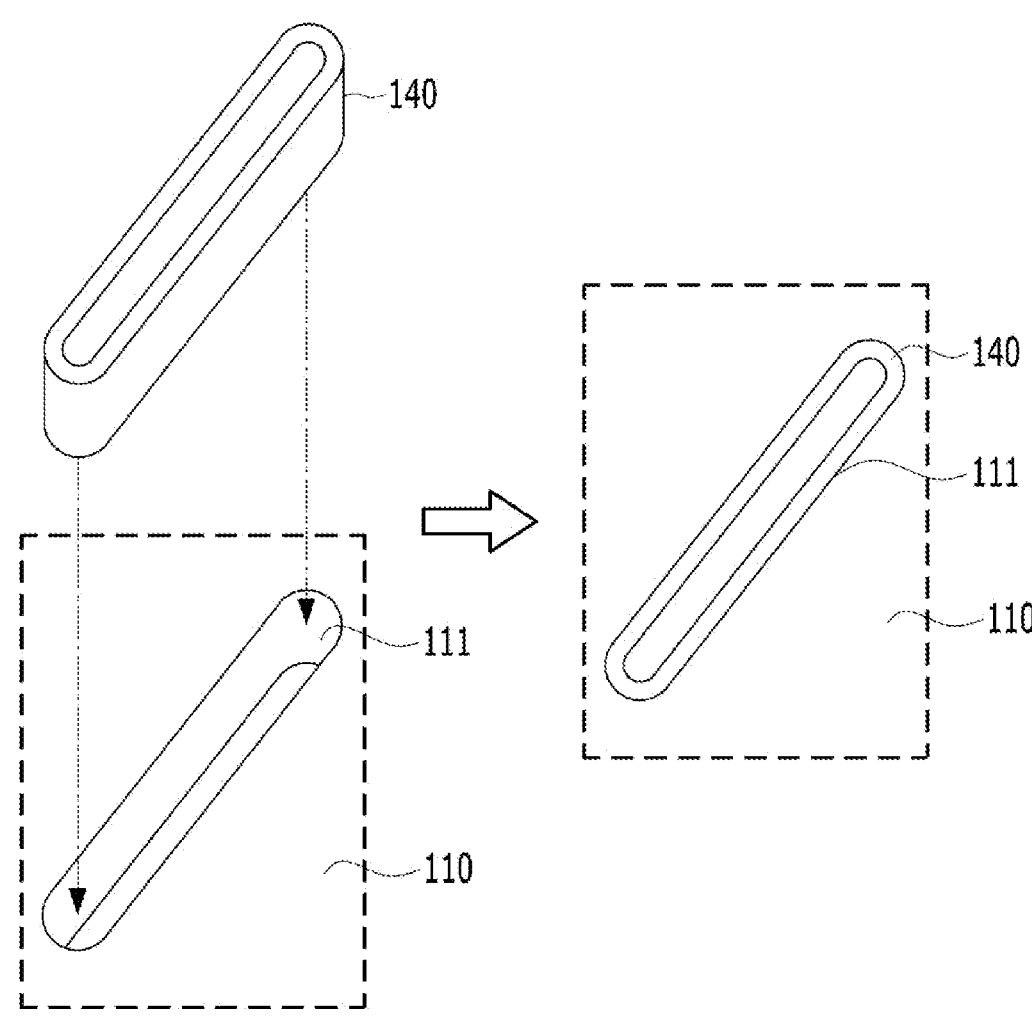

[FIG. 8]
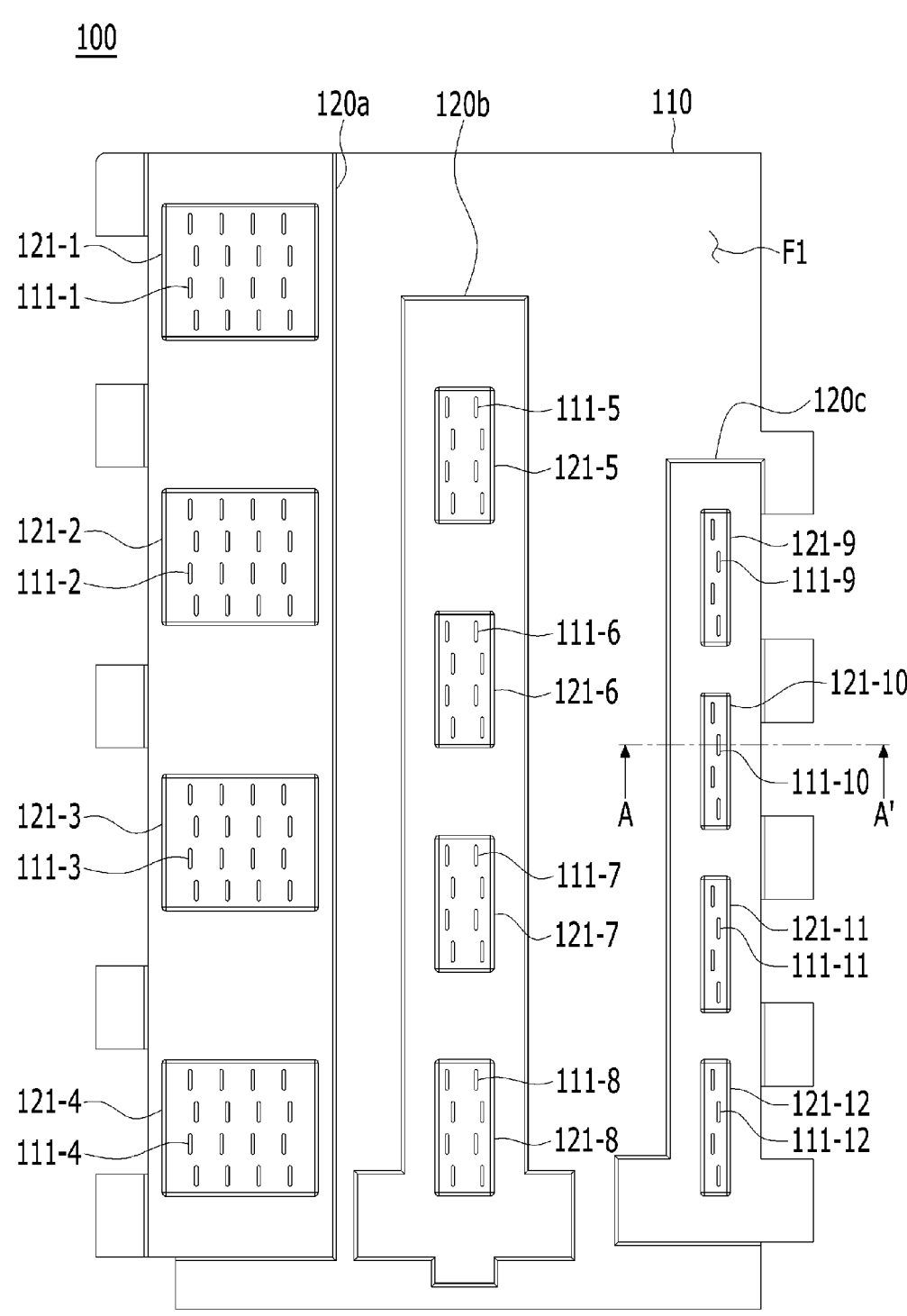

[FIG. 9]
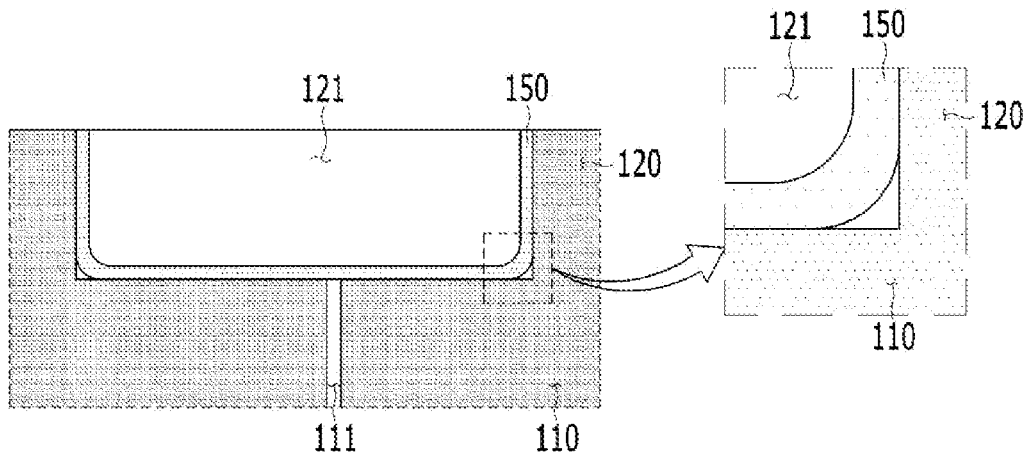
[FIG. 10]
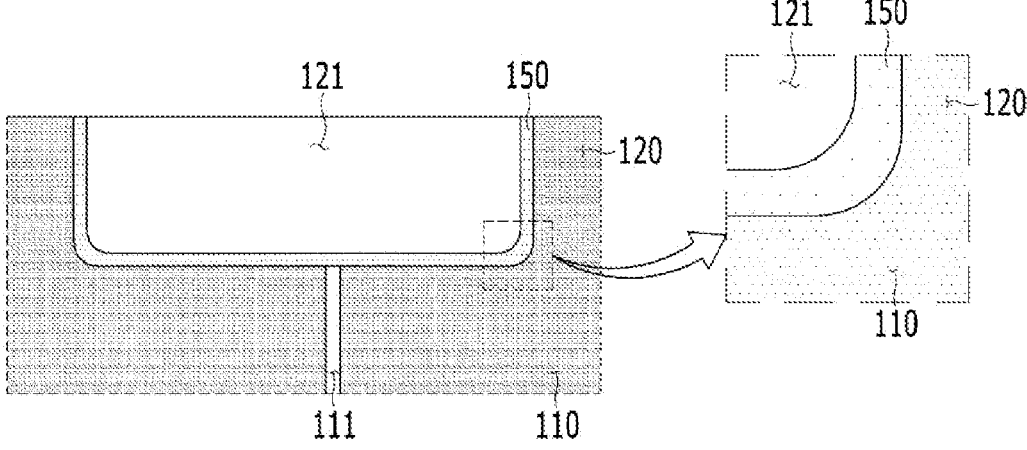

RADAR ANTENNA

TECHNICAL FIELD

The present disclosure relates to an antenna, and more particularly, to a radar antenna.

BACKGROUND ART

A radar antenna tends to be used to transmit and receive signals for detecting an object around a vehicle. The radar antenna enables whether an object is present or not, a distance from the object, a moving direction of the object, a moving speed of the object, the identification of the object, the classification of the object, etc. based on a reflected wave or scattered wave of a radio wave that hits the object and that is then returned therefrom by radiating the radio wave to the object.

Technologies for widening a detection range of such a radar antenna and increasing performance thereof are recently researched in order to advance radar for preventing a collision of an autonomous vehicle in preparation for the unmanned vehicle era.

A conventional radar antenna has a problem in that independent performance of a radiator is reduced or radiation performance of the antenna is reduced due to the occurrence of mutual coupling between multiple radiators because the radiators having different roles are arranged.

The contents described in the Background Art are to help the understanding of the background of the disclosure, and may include contents that are not a disclosed conventional technology that has already been known to a person having ordinary knowledge in the art to which this technology belongs.

DISCLOSURE

Technical Problem

The present disclosure has been proposed to solve the problem, and an object of the present disclosure is to provide a radar antenna which prevents mutual coupling between antennas by forming a shielding space corresponding to each antenna of an antenna body by using an accommodation hole of a shielding frame.

Furthermore, another object of the present disclosure is to provide a radar antenna in which a rounded edge surface is formed in an accommodation hole formed by an antenna body and a shielding frame.

Technical Solution

In order to achieve the object, a radar antenna according to an embodiment of the present disclosure includes an antenna body in which a plurality of first slots is formed in a first surface of the antenna body and a shielding frame in which an accommodation hole that accommodates the plurality of first slots is formed and which is disposed in the first surface of the antenna body so that the accommodation hole accommodates the plurality of first slots. An edge at which an inner wall surface of the shielding frame and the first surface of the antenna body are connected is formed to have a round structure.

An apex of a vertical cross section of the accommodation hole, which is connected to the antenna body and the shielding frame, may have a rounded rectangle shape. The accommodation hole may have a rounded edge surface disposed at the edge at which the antenna body and the shielding frame are connected. The rounded edge surface may become close to the first slot as becoming close to the antenna body. An edge connected to the antenna body and the shielding frame, among edges of the accommodation hole, may have a round shape.

The edge at which the antenna body and the shielding frame may be connected has a concave round shape. The edge at which the antenna body and the shielding frame are connected may become close to the first slot as becoming close to the antenna body.

A plated metal layer may be formed in the accommodation hole which is formed by the first surface of the antenna body and the inner wall surface of the shielding frame.

Advantageous Effects

According to the present disclosure, the radar antenna has an effect in that it can prevent the occurrence of separation between the antenna body and the shielding frame, and the plating layer because an edge at which the antenna body and the shielding frame are connected can be smoothly plated upon plating by forming the rounded edge surface in the accommodation hole that is formed by the antenna body and the shielding frame.

Furthermore, the radar antenna has an effect in that it can prevent a crack from occurring in the antenna body, the shielding frame, and the plating layer because an edge at which the antenna body and the shielding frame are connected can be smoothly plated upon plating by forming the rounded edge surface in the accommodation hole that is formed by the antenna body and the shielding frame.

Furthermore, the radar antenna has an effect in that it can prevent performance of the radar antenna from being deteriorated because the separation of the plating layer and a crack in the plating layer is prevented by forming the rounded edge surface in the accommodation hole.

Furthermore, the radar antenna has effects in that a failure can be prevented and a production yield can be improved when the radar antenna is manufactured by forming the round structure.

DESCRIPTION OF DRAWINGS

FIGS. 1 and 2 are perspective views for describing a radar antenna according to an embodiment of the present disclosure.

FIG. 3 is a top view illustrating a first surface of the radar antenna according to an embodiment of the present disclosure.

FIG. 4 is a bottom view illustrating a second surface of the radar antenna according to an embodiment of the present disclosure.

FIGS. 5 and 6 are diagrams for describing a wave guide formed in an antenna body of FIG. 1.

FIG. 7 is a diagram for describing a modified example of the antenna body of FIG. 1.

FIG. 8 is a diagram for describing a shielding frame of FIG. 1.

FIG. 9 is a diagram for describing a case in which the shielding frame of FIG. 1 has been formed to have a right-angled structure.

FIG. 10 is a diagram for describing a case in which the shielding frame of FIG. 1 has been formed to have a round structure.

MODE FOR INVENTION

Hereinafter, the most preferred exemplary embodiments of the present disclosure will be described with reference to the accompanying drawings in order to specifically describe the exemplary embodiments so that those skilled in the art to which the present disclosure pertains may easily implement the technical spirit of the present disclosure. First, in adding reference numerals to the components of each drawing, it should be noted that the same components have the same reference numerals as much as possible even if they are displayed in different drawings. Further, in describing the present disclosure, when it is determined that the detailed description of the related well-known configuration or function may obscure the gist of the present disclosure, the detailed description thereof will be omitted.

Referring to FIGS. 1 and 2, a radar antenna 100 according to an embodiment of the present disclosure includes an antenna body 110.

The antenna body 110 forms an external appearance of the radar antenna 100, and is formed in a flat plate shape having a predetermined thickness. The antenna body 110 has a first surface F1 and a second surface F2 opposite to the first surface F1.

A substrate 10 may be disposed in the second surface F2 of the antenna body 110. The substrate 10 transmits a radio wave to the outside through the radar antenna 100, receives a radio wave received from the radar antenna 100, and processes a signal of the radio wave. In this case, the first surface F1 is a front surface of the antenna body 110, and the second surface F2 is a back surface of the antenna body 110, for example.

Referring to FIG. 3, a plurality of first slots 111 is formed in the first surface F1 of the antenna body 110. The plurality of first slots 111 formed in the first surface F1 of the antenna body 110 is classified into a plurality of groups of the first slots 111. Each of the groups of the plurality of first slots 111 constitutes an antenna. In this case, the group of first slots 111 constitutes one antenna, among an antenna for radiation and an antenna for reception. In this case, the antenna for radiation is an antenna that radiates a radio wave. The antenna for reception is an antenna that receives a radio wave that is radiated by the antenna for radiation and then reflected by an object after hitting the object. In this case, the antenna in which the group of first slots 111 has been formed operates as the antenna for radiation, which radiates the radio wave, or the antenna for reception, which receives a radio wave that is radiated by the antenna for radiation and reflected by an object after hitting the object.

For example, referring to FIG. 3, a plurality of (1-1)-th slots 111-1, a plurality of (1-2)-th slots 111-2, a plurality of (1-3)-th slots 111-3, a plurality of (1-4)-th slots 111-4, a plurality of (1-5)-th slots 111-5, a plurality of (1-6)-th slots 111-6, a plurality of (1-7)-th slots 111-7, a plurality of (1-8)-th slots 111-8, a plurality of (1-9)-th slots 111-9, a plurality of (1-10)-th slots 111-10, a plurality of (1-11)-th slots 111-11, and a plurality of (1-12)-th slots 111-12 are formed in the first surface F1 of the antenna body 110. The twelve groups (i.e., antennas) of first slots 111 are formed in the first surface F1 of the antenna body 110.

The plurality of (1-1)-th slots 111-1 is disposed in a matrix form to form a (1-1)-th slot group 112-1 (i.e., a first antenna).

The plurality of (1-2)-th slots 111-2 is disposed at a location spaced apart from the (1-1)-th slot group 112-1 in a matrix form, thus forming a (1-2)-th slot group 112-2 (i.e., a second antenna).

The plurality of (1-3)-th slots 111-3 is disposed at a location spaced apart from the (1-1)-th slot group 112-1 and the (1-2)-th slot group 112-2 in a matrix form, thus forming a (1-3)-th slot group 112-3 (i.e., a third antenna).

The plurality of (1-4)-th slots 111-4 is disposed at a location spaced apart from the (1-1)-th slot group 112-1 to the (1-3)-th slot group 112-3 in a matrix form, thus forming a (1-4)-th slot group 112-4 (i.e., a fourth antenna).

The plurality of (1-5)-th slots 111-5 is disposed at a location spaced apart from the (1-1)-th slot group 112-1 to the (1-4)-th slot group 112-4 in a matrix form, thus forming a (1-5)-th slot group 112-5 (i.e., a fifth antenna).

The plurality of (1-6)-th slots 111-6 is disposed at a location spaced apart from the (1-1)-th slot group 112-1 to the (1-5)-th slot group 112-5 in a matrix form, thus forming a (1-6)-th slot group 112-6 (i.e., a sixth antenna).

The plurality of (1-7)-th slots 111-7 is disposed at a location spaced apart from the (1-1)-th slot group 112-1 to the (1-6)-th slot group 112-6 in a matrix form, thus forming a (1-7)-th slot group 112-7 (i.e., a seventh antenna).

The plurality of (1-8)-th slots 111-8 is disposed at a location spaced apart from the (1-1)-th slot group 112-1 to the (1-7)-th slot group 112-7 in a matrix form, thus forming a (1-8)-th slot group 112-8 (i.e., an eighth antenna).

The plurality of (1-9)-th slots 111-9 is disposed at a location spaced apart from the (1-1)-th slot group 112-1 to the (1-8)-th slot group 112-8 in a matrix form, thus forming a (1-9)-th slot group 112-9 (i.e., a ninth antenna).

The plurality of (1-10)-th slots 111-10 is disposed at a location spaced apart from the (1-1)-th slot group 112-1 to the (1-9)-th slot group 112-9 in a matrix form, thus forming a (1-10)-th slot group 112-10 (i.e., a tenth antenna).

The plurality of (1-11)-th slots 111-11 is disposed at a location spaced apart from the (1-1)-th slot group 112-1 to the (1-10)-th slot group 112-10) in a matrix form, thus forming a (1-11)-th slot group 112-11 (i.e., an eleventh antenna).

The plurality of (1-12)-th slots 111-12 is disposed at a location spaced apart from the (1-1)-th slot group 112-1 to the (1-11)-th slot group 112-11) in a matrix form, thus forming a (1-12)-th slot group 112-12 (i.e., a twelfth antenna).

In this case, each of the antennas (i.e., the first antenna to the twelfth antenna) formed by the (1-1)-th slot group 112-1 to the (1-12)-th slot group 112-12 operates as an antenna for radiation, which radiates a radio wave, or an antenna for reception, which receives a radio wave that is radiated by an antenna for radiation and reflected by an object after hitting the object.

In this case, in FIG. 3, in order to describe the antenna body 110, the twelve groups of first slots 111 (i.e., the twelve antennas) have been described as being formed as an example, but the present disclosure is not limited thereto. The number of antennas, locations at which the first slots 111 are disposed, and structures of the first slots may be changed depending on required antenna characteristics.

A plurality of second slots 113 is formed in the second surface F2 of the antenna body 110. The plurality of second slots 113 constitutes reception ports or transmission ports. That is, the plurality of second slots 113 is formed as transmission ports that are connected to a transmission terminal of the substrate 10 or as reception ports that are connected to a reception terminal of the substrate 10.

The plurality of second slots 113 is constructed to be matched with the antennas formed in the first surface F1 of the antenna body 110. One or more second slots 113 are matched with the antenna formed in the first surface F1 of the antenna body 110. Accordingly, the number of second slots 113 is greater than the number of antennas formed in the first surface F1 of the antenna body 110.

For example, referring to FIG. 4, a (2-1)-th slot 113-1, a (2-2)-th slot 113-2, a (2-3)-th slot 113-3, a (2-4)-th slot 113-4, a (2-5)-th slot 113-5, a (2-6)-th slot 113-6, a (2-7)-th slot 113-7, a (2-8)-th slot 113-8, a (2-9)-th slot 113-9, a (2-10)-th slot 113-10, a (2-11)-th slot 113-11, and a (2-12)-th slot 113-12 are formed in the second surface F2 of the antenna body 110.

In this case, the (2-1)-th slot 113-1 overlaps the first antenna (i.e., the (1-1)-th slot group 112-1) of the first surface F1 of the antenna body 110. The (2-2)-th slot 113-2 overlaps the second antenna (i.e., the (1-2)-th slot group 112-2) of the first surface F1 of the antenna body 110. The (2-3)-th slot 113-3 overlaps the third antenna (i.e., the (1-3)-th slot group 112-3) of the first surface F1 of the antenna body 110. The (2-4)-th slot 113-4 overlaps the fourth antenna (i.e., the (1-4)-th slot group 112-4) of the first surface F1 of the antenna body 110. The (2-5)-th slot 113-5 overlaps the fifth antenna (i.e., the (1-5)-th slot group 112-5) of the first surface F1 of the antenna body 110. The (2-6)-th slot 113-6 overlaps the sixth antenna (i.e., the (1-6)-th slot group 112-6) of the first surface F1 of the antenna body 110. The (2-7)-th slot 113-7 overlaps the seventh antenna (i.e., the (1-7)-th slot group 112-7) of the first surface F1 of the antenna body 110. The (2-8)-th slot 113-8 overlaps the eighth antenna (i.e., the (1-8)-th slot group 112-8) of the first surface F1 of the antenna body 110. The (2-9)-th slot 113-9 overlaps the ninth antenna (i.e., the (1-9)-th slot group 112-9) of the first surface F1 of the antenna body 110. The (2-10)-th slot 113-10 overlaps the tenth antenna (i.e., the (1-10)-th slot group 112-10) of the first surface F1 of the antenna body 110. The (2-11)-th slot 113-11 overlaps the eleventh antenna (i.e., the (1-11)-th slot group 112-11) of the first surface F1 of the antenna body 110. The (2-12)-th slot 113-12 overlaps the twelfth antenna (i.e., the (1-12)-th slot group 112-12) of the first surface F1 of the antenna body 110.

Referring to FIGS. 5 and 6, a plurality of wave guides 130, that is, paths along which radio waves move, is formed within the antenna body 110. The wave guide 130 connects the plurality of first slots 111 and the plurality of second slots 113, and forms a radio wave movement path along which a radio wave is moved between the first slots 111 and the second slots 113.

For example, the wave guide 130 is formed within the antenna body 110, and connects the plurality of first slots 111 and the one or more second slots 113 to form a radio wave movement path along which a radio wave output by the substrate 10 is moved (radiated) to the outside of the radar antenna 100 or a radio wave reflected by an object is moved to the substrate 10 (i.e., the reception terminal).

Meanwhile, antenna performance of the radar antenna 100 is sensitively changed depending on the measurement (size) of a slot in a high frequency band of approximately 76.5 GHz because the radar antenna is an antenna consisting of a plurality of slots.

If the radar antenna 100 is manufactured by using plastic in order to reduce a unit cost of goods (production cost), there are problems in that it becomes difficult to precisely process the measurement (size) of a slot due to a manufacturing tolerance and it is difficult to implement constant antenna performance due to a change in the measurement of a slot.

Accordingly, referring to FIG. 7, the radar antenna 100 according to an embodiment of the present disclosure may further include a plurality of slot members 140 each inserted into the first slot 111.

The slot member 140 is made of a metal material, and has a slot formed therein a frame shape. The slot member 140 is inserted and fixed to the first slot 111 of the antenna body 110. To this end, the slot member 140 is formed to have the same design measurement as the first slot 111.

The measurement of the first slot 111 of the radar antenna 100 can be uniformly formed by reducing a manufacturing tolerance in a way to insert the slot member 140 into the first slot 111.

Furthermore, the radar antenna 100 has an additional effect in that it can increase the yield because the measurement of the first slot 111 can be uniformly maintained by replacing the slot member 140 when a measurement failure occurs in the first slot 111.

Furthermore, the radar antenna 100 can uniformly implement antenna performance by making the uniform measurement of the first slot 111.

The antenna body 110 itself can operate as the radar antenna 100. However, the antenna body 110 includes a plurality of antennas that transmits or receives different frequency bands or that operates for frequency transmission or frequency reception. Accordingly, independent antenna performance of the antenna body 110 may be reduced because mutual coupling between the antennas occurs.

Accordingly, a shielding frame 120 that prevents mutual coupling between antennas is formed in the first surface F1 of the antenna body 110. In this case, in an embodiment of the present disclosure, the shielding frame 120 has been illustrated and described as being formed integrally with the antenna body 110, but the present disclosure is not limited thereto. After being formed separately from the antenna body 110, the shielding frame 120 may be stacked on the first surface F1 of the antenna body 110.

The shielding frame 120 is formed to protrude from the first surface F1 of the antenna body 110. The shielding frame 120 is formed to protrude from the first surface F1 of the antenna body 110 in which the plurality of first slots 111 has been formed.

Furthermore, the thickness of the shielding frame 120 may be different depending on an antenna characteristic, the size of the antenna, a surrounding environment, etc. An interval between the first slots 111 and the shielding frame 120 may be different depending on an antenna characteristic, the size of the antenna, a surrounding environment, etc. Accordingly, in an embodiment of the present disclosure, a material, a shape, a thickness, an interval, etc. of the shielding frame 120 are not limited by numerical values.

One or more accommodation holes that accommodate the first slots 111 are formed in the shielding frame 120. In this case, the accommodation holes accommodate some of the plurality of first slots 111, but accommodate multiple first slots 111 that belong to the same slot group. The accommodation hole is formed to penetrate the shielding frame 120 having a flat plate shape. When viewed in the direction of the first surface F1 of the antenna body 110, the accommodation hole is formed in a rectangle shape. In this case, the accommodation hole may be formed in another shape, such as a circular shape, depending on a required antenna specification.

The shielding frame 120 forms a shielding space for preventing mutual coupling between antennas formed by the plurality of first slots 111. The accommodation hole of the shielding frame 120 and the first surface F1 of the antenna body 110 form a shielding space. An inner wall surface of the accommodation hole forms a shielding wall, that is, an outer wall of the shielding space that shields the antennas formed by the first slots 111. The first surface F1 of the antenna body 110 forms a bottom surface of the shielding space. The shielding frame 120 can prevent mutual coupling between the antennas formed the plurality of first slots 111 through the bottom surface.

For example, the same number of accommodation holes as the number of groups of first slots 111 is formed in the shielding frame 120. The shielding frame 120 may consist of a plurality of frames in each of which one accommodation hole or a plurality of accommodation holes has been formed.

For example, referring to FIG. 8, the shielding frame 120 may include a first shielding frame 120*a*, a second shielding frame 120*b*, and a third shielding frame 120*c*.

A first accommodation hole 121-1, a second accommodation hole 121-2, a third accommodation hole 121-3, and a fourth accommodation hole 121-4 that accommodate the (1-1)-th slot group 112-1 to the (1-4)-th slot group 112-4 (i.e., the first antenna to the fourth antenna), respectively, are formed in the first shielding frame 120*a*.

A fifth accommodation hole 121-5, a sixth accommodation hole 121-6, a seventh accommodation hole 121-7, and an eighth accommodation hole 121-8 that accommodate the (1-5)-th slot group 112-5 to the (1-8)-th slot group 112-8 (i.e., the fifth antenna to the eighth antenna), respectively, are formed in the second shielding frame 120*b*.

A ninth accommodation hole 121-9, a tenth accommodation hole 121-10, an eleventh accommodation hole 121-11, and a twelfth accommodation hole 121-12 that accommodate the (1-9)-th slot group 112-9 to the (1-12)-th slot group 112-12 (i.e., the ninth antenna to the twelfth antenna), respectively, are formed in the third shielding frame 120*c*.

Meanwhile, the antenna body 110 and the shielding frame 120 may be formed by plating metal for shielding on a resin material.

Referring to FIG. 9, the shielding frame 120 may be formed to have a right-angled structure in which the inner wall surface of the shielding frame 120 is orthogonal to the first surface F1 of the antenna body 110. In this case, in a process of plating the radar antenna 100, separation may occur between the antenna body 110 and the shielding frame 120, and the plating layer 150 or a crack may occur in the antenna body 110, the shielding frame 120, or the plating layer 150 because a portion where the antenna body 110 and the shielding frame 120 are connected is not plated. Accordingly, antenna performance of the radar antenna 100 may be deteriorated.

Accordingly, referring to FIG. 10, the radar antenna 100 according to an embodiment of the present disclosure is formed to have a round structure in which the inner wall surface of the shielding frame 120 forms a predetermined angle with the first surface F1 of the antenna body 110.

The radar antenna 100 may be formed so that an edge at which the antenna body 110 and the shielding frame 120 are connected has a concave round shape. In this case, the edge at which the antenna body and the shielding frame are connected may have a round shape that becomes close to the first slot 111 as the edge becomes close to the antenna body.

Accordingly, an apex of a vertical cross section of an accommodation hole 121, which is connected to the antenna body 110 and the shielding frame 120, may have a rounded rectangle shape. The accommodation hole 121 may have a rounded edge surface disposed at the edge at which the antenna body 110 and the shielding frame 112 are connected. In this case, the rounded edge surface may become close to the first slot 111 as becoming close to the first surface F1 of the antenna body 110. As described above, an edge connected to the antenna body 110 and the shielding frame 120, among edges of the accommodation hole 121, may have a round shape.

In this case, the occurrence of separation between the antenna body 110 and the shielding frame 120, and the plating layer 150 can be prevented and a crack can be prevented from occurring in the antenna body 110, the shielding frame 120, and the plating layer 150 because a portion where the antenna body 110 and the shielding frame 120 are connected can be smoothly plated in a process of plating the radar antenna 100. Accordingly, antenna performance of the radar antenna 100 according to an embodiment of the present disclosure can be prevented from being deteriorated.

Furthermore, the radar antenna 100 according to an embodiment of the present disclosure can prevent a failure and improve a production yield when the radar antenna 100 is manufactured because the round structure is formed.

Although the preferred exemplary embodiment according to the present disclosure has been described above, it is understood that changes may be made in various forms, and those skilled in the art may practice various changed examples and modified examples without departing from the claims of the present disclosure.

The invention claimed is:

1. A radar antenna comprising:

an antenna body in which a plurality of first slots is formed in a first surface of the antenna body;

a shielding frame having a flat shape with a predetermined thickness and formed to protrude from the first surface of the antenna body, wherein the shielding frame includes an accommodation hole penetrating the shielding frame in an up-and-down direction and accommodating the plurality of first slots, wherein an edge at which an inner wall surface of the shielding frame and the first surface of the antenna body are connected is formed to have a concave round structure, and a plated metal layer formed in the accommodation hole, wherein the plated metal layer is disposed along the concave round structure formed at the connection between the inner wall surface of the shielding frame and the first surface of the antenna body.

2. The radar antenna of claim 1, wherein an apex of a vertical cross section of the accommodation hole, which is connected to the antenna body and the shielding frame, has a rounded rectangle shape.

3. The radar antenna of claim 1, wherein the accommodation hole has a rounded edge surface disposed at the edge at which the antenna body and the shielding frame are connected.

4. The radar antenna of claim 3, wherein the rounded edge surface becomes close to the first slot as becoming close to the antenna body.

* * * * *